United States Patent
Liebold et al.

(10) Patent No.: US 8,718,871 B2
(45) Date of Patent: May 6, 2014

(54) METHOD FOR SETTING THE DAMPING FORCE FOR AT LEAST ONE VIBRATION DAMPER

(75) Inventors: Jochen Liebold, Schweinfurt (DE); Thorsten Brobeil, Rottenburg (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 79 days.

(21) Appl. No.: 13/363,499

(22) Filed: Feb. 1, 2012

(65) Prior Publication Data

US 2012/0203429 A1    Aug. 9, 2012

(30) Foreign Application Priority Data

Feb. 4, 2011    (DE) .......................... 10 2011 000 508

(51) Int. Cl.
*B60G 23/00* (2006.01)
*B60G 17/015* (2006.01)
*B60G 17/02* (2006.01)

(52) U.S. Cl.
USPC .............. 701/37; 701/38; 280/5.5; 280/5.515

(58) Field of Classification Search
USPC ............. 701/37, 38; 280/5.5, 5.515; 188/378; 267/136
See application file for complete search history.

(56) References Cited

U.S. PATENT DOCUMENTS

| | | | |
|---|---|---|---|
| 5,425,436 A * | 6/1995 | Teramura et al. ............. | 188/280 |
| 7,013,206 B2 * | 3/2006 | Stiller et al. .................... | 701/37 |
| 2002/0161498 A1 * | 10/2002 | Stiller et al. .................... | 701/37 |
| 2004/0128040 A1 * | 7/2004 | Stiller et al. .................... | 701/37 |
| 2008/0234896 A1 * | 9/2008 | Kato et al. ....................... | 701/37 |
| 2010/0049394 A1 * | 2/2010 | Ammon et al. ................. | 701/29 |

FOREIGN PATENT DOCUMENTS

DE    10120918 A1    10/2002

* cited by examiner

*Primary Examiner* — Khoi Tran
*Assistant Examiner* — Robert Nguyen
(74) *Attorney, Agent, or Firm* — RatnerPrestia

(57) ABSTRACT

A method for setting the damping force for at least one motor vehicle vibration damper which is connected between a vehicle body and a wheel, wherein, for the vibration damper or for each vibration damper, a damping force is determined and set within an actuating range defined by a lower limiting value and an upper limiting value, as a function of a vertical movement of the vehicle body, and as a function of a vertical movement of the respective wheel, and wherein the lower limiting value of the actuating range is also determined as a function of the vertical movement of the vehicle body and as a function of the vertical movement of the respective wheel.

16 Claims, 2 Drawing Sheets

METHOD FOR SETTING THE DAMPING FORCE FOR AT LEAST ONE VIBRATION DAMPER

CROSS-REFERENCE TO RELATED APPLICATIONS

This application claims priority under 35 U.S.C. §119 of German Patent Application No. DE 10 2011 000508.0, filed Feb. 4, 2011, which is incorporated by reference herein in its entirety.

FIELD OF THE INVENTION

The invention relates to a method for setting the damping force for at least one vibration damper of a motor vehicle which is connected between a vehicle body and a wheel, wherein, for the vibration damper or for each vibration damper, a damping force is determined and set within an actuating range defined by a lower limiting value and an upper limiting value, as a function of a vertical movement of the vehicle body, and as a function of a vertical movement of the respective wheel. Furthermore, the invention relates to a motor vehicle having a vehicle body and wheels which are suspended from the vehicle body, wherein a vibration damper is connected between each wheel and the vehicle body, and wherein the damping force of the vibration damper, or of each vibration damper, is determined and can be set within an actuating range defined by a lower limiting value and an upper limiting value, as a function of a vertical movement of the vehicle body, and as a function of a vertical movement of the respective wheel.

BACKGROUND OF THE INVENTION

DE 101 20 918 A1 discloses a method for setting the damping force for at least one vibration damper according to what is referred to as the skyhook method. According to the skyhook method, the setting of the damping force for a motor vehicle vibration damper which is connected between a vehicle body and a wheel is carried out in such a way that a damping force for the vibration damper is determined and set, specifically within an actuating range which is defined by a lower limiting value and an upper limiting value, as a function of a vertical movement of the vehicle body, and as a function of a vertical movement of the wheel.

DE 101 20 918 A1 also discloses changing the upper limiting value and/or the lower limiting value of the actuating range, specifically as a function of a specific driving situation. In this prior art it is therefore proposed to set the lower limiting value for the actuating range of the damping force and therefore a soft damper setting as a function of a vehicle speed and/or a vehicle lateral acceleration. Furthermore, it is proposed in this prior art to make a change in the upper limiting value of the actuating range for the damping force and therefore a hard damper setting as a function of a detection of the state of the road.

The change in the lower limiting value and/or upper limiting value of the actuating range for the damping force, which is carried out according to DE 101 20 918 A1, acts uniformly over all the operating ranges of the vibration damper.

SUMMARY OF THE INVENTION

Taking this as a basis, the present invention is based on the object of providing a novel method for setting the damping force for at least one vibration damper, and a novel motor vehicle.

This object is achieved by means of a method as claimed in claim 1. According to aspects of the invention, the lower limiting value of the actuating range for the damping force, which is like the damping force as such, is determined as a function of the vertical movement of the vehicle body and as a function of the vertical movement of the respective wheel.

With the present invention here it is possible for the first time to determine, for different operating ranges of a vibration damper of a motor vehicle, an individual lower limiting value of the actuating range as a function of the vertical movement of the vehicle body and as a function of the vertical movement of the respective wheel, preferably as a function of the vertical movement direction of the vehicle body and as a function of the vertical relative movement between the vehicle body and the respective wheel. In this way, a driving behavior, in particular driving comfort, of a motor vehicle can be improved further. With the invention, it is possible to allow, in all operating ranges of a vibration damper, both for the requirement for a comfortable vibration behavior of the vehicle body and for the requirement for a high level of driving safety and wheel damping.

According to one advantageous development of the invention, the vertical movement direction of the vehicle body and the vertical relative movement between the vehicle body and the respective wheel are divided into a plurality of ranges, specifically into a first range in which the vehicle body moves upward and the respective wheel moves downward or more slowly upward, into a second range in which the vehicle body moves downward and the respective wheel moves more quickly downward, into a third range in which the vehicle body moves downward and the respective wheel moves upward or more slowly downward, and into a fourth range in which the vehicle body moves upward and the respective wheel moves more quickly upward, wherein an individual, lower limiting value of the actuating range, which differs from the other ranges, is determined for at least one of these ranges. The above determination of the lower limiting value of the actuating range of the damping force as a function of the four ranges or operating ranges of a vibration damper makes particularly optimum determination of the lower limiting value of the actuating range for the damping force possible.

The basic principle of the skyhook method is applied not only to the determination of the damping force as such, but also to the determination of at least the lower limiting value for the actuating range of the damping force. The lower limiting value of the actuating range of the damping force can be determined individually in any operating range of the vibration damper.

For at least two of these ranges, specifically at least the second range and the fourth range, a lower limiting value of the actuating range, which differs from the other ranges, is determined preferably. This is advantageous, in particular, for simultaneously ensuring a high level of driving comfort and a high level of driving safety.

The motor vehicle according to aspects of the invention is defined in claim 8.

Preferred developments of the invention emerge from the dependent claims and the following description. Exemplary embodiments of the invention are explained in more detail with reference to the drawing, without being restricted or limited to said exemplary embodiments.

DETAILED DESCRIPTION OF THE PREFERRED EMBODIMENT

Figure 1:
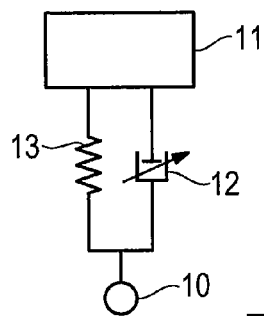
FIG. 1: shows a schematic detail of a motor vehicle.

FIG. 1 shows a highly schematic detail of a motor vehicle in the region of a wheel 10 of the motor vehicle and of a vehicle body 11 thereof, wherein according to FIG. 1, on the one hand, a vibration damper 12 and, on the other hand, a spring element 13 are connected between the vehicle body 11 and the wheel 10. According to FIG. 1, the damping force of the vibration damper 12 which is connected between the wheel 10 and the vehicle body 11 can be set.

Figure 2:
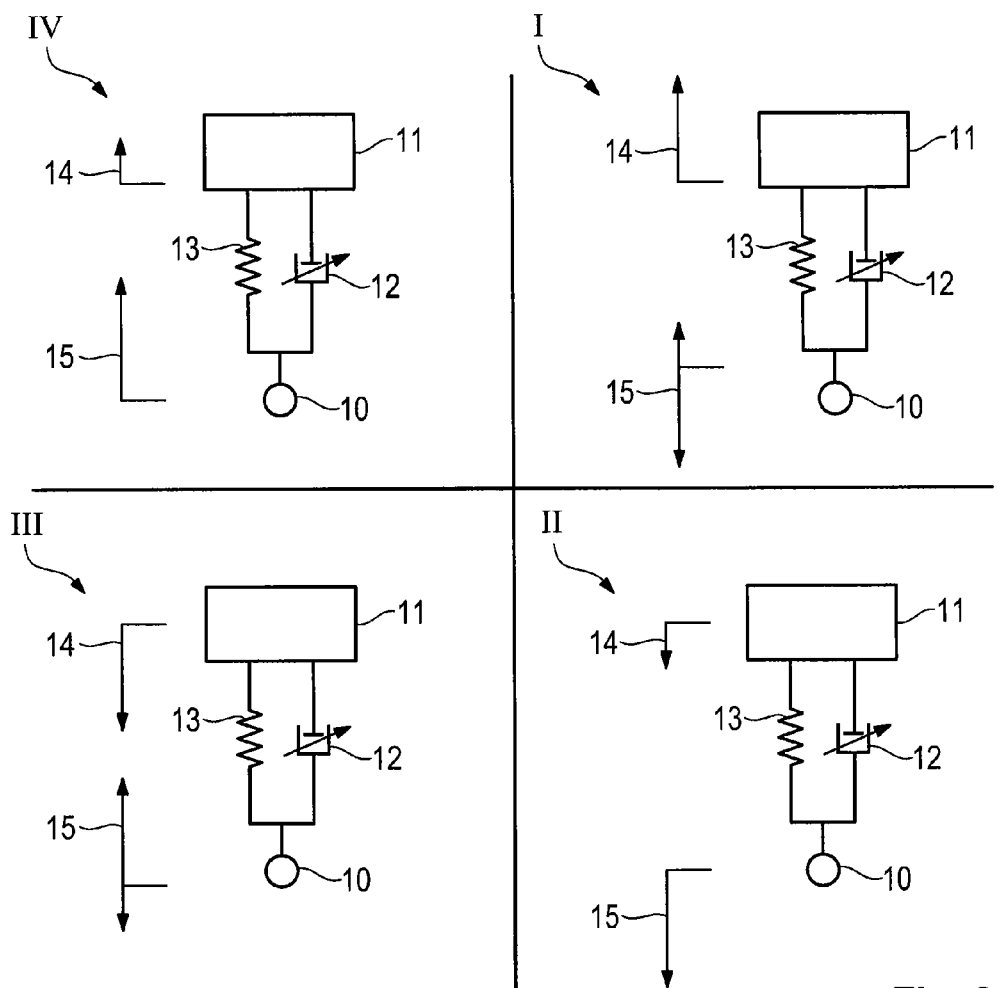
FIG. 2: shows the detail from FIG. 1 in four different states clarifying the invention.

FIG. 2 clarifies different ranges or operating ranges of the vibration damper 12 which is shown in FIG. 1 and can be set with respect to its damping force, as a function of a vertical movement of the vehicle body 11, which is represented in FIG. 2 by arrows 14, and as a function of a vertical relative movement between the vehicle body 11 and the respective wheel 10, wherein this vertical relative movement is represented in FIG. 2 by arrows 15.

FIG. 2 shows four different ranges or operating ranges I, II, III and IV for the vibration damper 12, wherein the operating range I is characterized in that the vehicle body 11 moves upward according to the arrow 14, and the respective wheel 10 moves downward or more slowly upward according to the arrow 15. The operating range II is characterized in that the vehicle body 11 moves downward according to the arrow 14, and the wheel 10 moves more quickly downward according to the arrow 15. The operating range III for the vibration damper 12 is characterized in that the vehicle body 11 moves downward according to the arrow 14, and the wheel 10 moves upward or more slowly downward according to the arrow 15. The operating range IV is characterized in that the vehicle body 11 moves upward according to the arrow 14, and the wheel 10 moves more quickly upward according to the arrow 15. The vertical upward and downward movement directions respectively relate to a roadway, wherein the faster or slower upward or downward movement of the wheel is related to the corresponding movement of the vehicle body 11.

In the operating ranges I and II, the respective vibration damper 12 operates in the extension direction, while in the operating ranges III and IV the respective vibration damper 12 operates in the compression direction. In the operating ranges I and IV, the speed of the motor vehicle body 11 is positive or directed upward, while in the operating ranges II and III the speed of the vehicle body 11 is negative or directed downward.

According to what is referred to as the skyhook method, the damping force for a settable or adjustable vibration damper 12 is, determined, on the one hand, as a function of the vertical movement of the vehicle body 11 and, on the other hand, as a function of the vertical movement of the respective wheel 10, in particular as a function of a vertical movement direction and/or as a function of a vertical speed and/or as a function of a vertical acceleration of the vehicle body 11 and of the respective wheel 10.

This basic determination of the damping force for a vibration damper as a function of the vertical movement of the vehicle body 11 and the vertical movement of the respective wheel 10 according to the skyhook method is familiar to the person skilled in the art in question here.

Furthermore, it is already known to determine and set the damping force determined according to the skyhook method within an actuating range which is defined by a lower limiting value and an upper limiting value, wherein according to the prior art the lower limiting value and the upper limiting value of the defined actuating range are identical over all the operating ranges I to IV of the vibration damper 12.

According to aspects of the invention it is now proposed to determine not only the value of the damping force within the actuating range as a function of the vertical movement of the vehicle body 11 and of the vertical movement of the respective wheel 10, but instead, according to the invention, in addition at least the lower limiting value of the actuating range for the damping force is determined as a function of the vertical movement of the vehicle body 11 and as a function of the vertical movement of the respective wheel 10, specifically preferably as a function of the vertical movement direction of the vehicle body 11 and as a function of the vertical relative movement between the vehicle body 11 and the respective wheel 10, with the result that accordingly an individual, lower limiting value of the respective actuating range for the damping force is determined for at least one of the operating ranges I, II, III and IV of the vibration damper 12.

Preferably, an individual, lower limiting value of the actuating range for the damping force is determined for at least two of the four operating ranges, specifically for the operating range II and the operating range IV, but it is also possible to determine an individual, lower limiting value of the actuating range for the damping force for each of the four operating ranges I to IV of the vibration damper 12.

Figure 3:
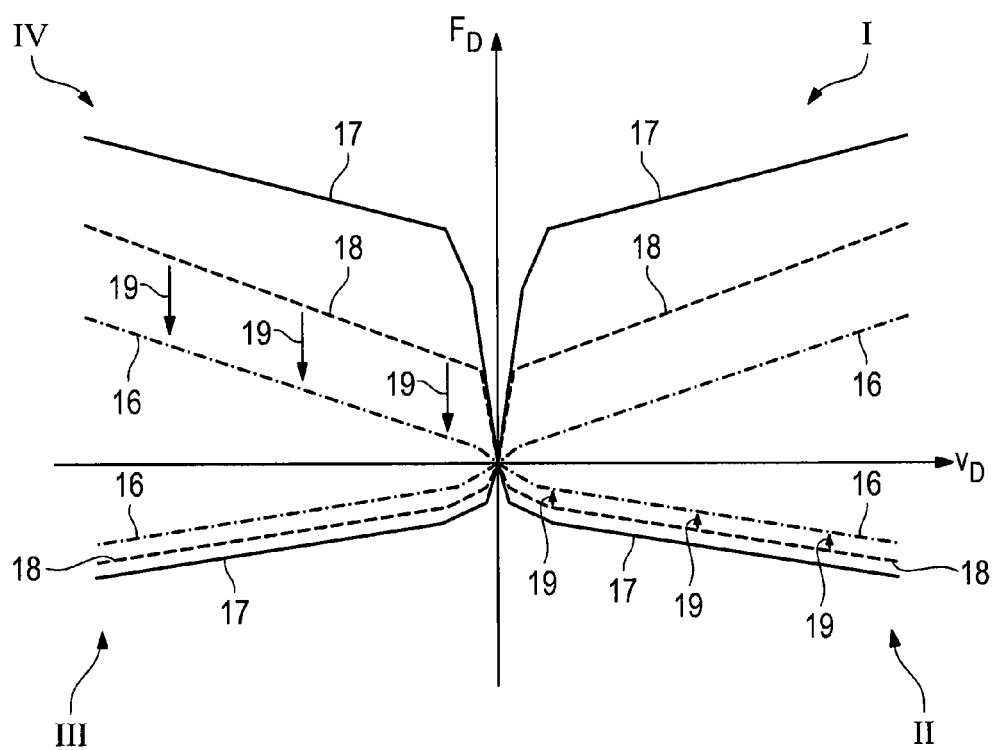
FIG. 3: shows a diagram further clarifying the invention.

Damper characteristic diagrams 16 and 17 are plotted in FIG. 3 for the abovementioned operating ranges I, II, III, IV of a vibration damper 12, wherein in the ranges I and II the vibration damper 12 is operated in the extension direction and in the ranges III and IV said vibration damper is operated in the compression direction. Consequently, in the ranges I and II a damper speed $v_D$ is positive, and in the operating ranges III and IV the damper speed $v_D$ is negative. In the operating ranges I and IV a damping force $F_D$ is positive, and in the operating ranges II and III it is negative. The damper characteristic diagram 16 consequently defines in all the operating ranges small damping forces $F_D$ in absolute terms plotted against the damper speed $v_D$, while the damper characteristic diagram 17 defines large damping forces $F_D$ in absolute terms plotted against the damper speed $v_D$.

In all the operating ranges I, II, III, IV, in addition to the damper characteristic diagrams 16 and 17 lower limiting values 18 are also plotted for the actuating range of a vibration damper 12, wherein, as is represented by arrows 19 in FIG. 3, the lower limiting value 18 of the actuating range for the damping force can be set individually at least in the operating ranges II and IV.

The lower limiting value for the actuating range of the damping force can preferably be parameterized or set individually at least in the operating ranges II and IV, preferably in each of the operating ranges I to IV. As a result, a separate minimum damping level can be assigned to each operating range. In particular, in the operating ranges II and IV a minimum damping level can be reduced, or even switched off, individually.

By virtue of the invention, an increase in the damping for wheels 10 of the motor vehicle continues to be without an adverse influence on the comfort which can be implemented for the vehicle body 11. In situations which are relevant for driving safety and in the case of braking and accelerating, no adverse influences are produced on the vehicle body comfort which can be implemented. What is referred to as basic damping can be increased without an adverse influence on the vehicle body comfort. The requirements which are made of vehicle body comfort, of driving safety and of wheel damping can be met to the same extent.

According to FIG. 3, in the operating ranges II and IV the lower limiting value for the actuating range of the damping force is preferably changed in the direction of soft damping, specifically as a function of the vertical movement of the vehicle body 11 and as a function of the vertical movement of the respective wheel 10.

In a further variant of the invention, it is additionally possible also to determine the upper limiting value of the actuating range for the damping force as a function of the vertical movement of the vehicle body and as a function of the vertical movement of the respective wheel 10, that is to say to provide an individual upper limiting value for the actuating range of the damping force for at least one operating range of the operating ranges I to IV of the vibration damper 12.

Furthermore, the invention relates to a motor vehicle having a vehicle body 11 and wheels 10 which are suspended from the vehicle body 11, wherein connected between each wheel 10 and the vehicle body 11 are at least one vibration damper 12 and a spring element 13 which is connected parallel to the vibration damper 12. The vibration dampers 12 are settable vibration dampers 12 whose damping force can be determined and set according to the skyhook method, wherein according to the invention at least the lower limiting value and, if appropriate, also the upper limiting value of the actuating range for the damping force of a vibration damper are dependent on the vertical movement of the vehicle body and dependent on the vertical movement of the respective wheel 10, with the result that an individual, lower limiting value of the actuating range for the damping force is therefore present at least in an operating range I to IV. This setting or determination of the lower limiting value and, if appropriate, upper limiting value of the actuating range of the damping force is performed and accordingly implemented in a device embodied as a control device.

The invention claimed is:

1. A method for setting the damping force for at least one motor vehicle vibration damper which is connected between a vehicle body and a wheel, wherein, for the vibration damper or for each vibration damper, a control device:
    determines and sets a damping force within an actuating range defined by a lower limiting value and an upper limiting value, as a function of a vertical movement of the vehicle body and as a function of a vertical movement of the respective wheel;
    determines the lower limiting value of the actuating range as a function of the vertical movement of the vehicle body and as a function of the vertical movement of the respective wheel;
    determines the lower limiting value of the actuating range as a function of a vertical movement direction of the vehicle body and as a function of a vertical relative movement between the vehicle body and the respective wheel;
    divides the vertical movement direction of the vehicle body and the vertical relative movement between the vehicle body and the respective wheel are divided into a plurality of ranges comprising a first range in which the vehicle body moves upward and the respective wheel moves downward or more slowly upward, a second range in which the vehicle body moves downward and the respective wheel moves more quickly downward, a third range in which the vehicle body moves downward and the respective wheel moves upward or more slowly downward, and a fourth range in which the vehicle body moves upward and the respective wheel moves more quickly upward; and
    determines an individual, lower limiting value of the actuating range, which differs from the other ranges, for at least one of these ranges.

2. The method as claimed in claim 1, wherein, for at least two of these ranges, specifically at least the second range and the fourth range, an individual, lower limiting value of the actuating range, which differs from the other ranges, is determined.

3. The method as claimed in claim 2, wherein, for each of these ranges, an individual, lower limiting value of the actuating range, which differs from the other ranges, is determined.

4. The method as claimed in claim 1, wherein the upper limiting value of the actuating range is also determined as a function of the vertical movement of the vehicle body and as a function of the vertical movement of the respective wheel.

5. The method as claimed in claim 2, wherein for at least one of these ranges an individual, upper limiting value, which differs from the other ranges, is determined.

6. A motor vehicle, comprising a vehicle body, wheels which are suspended from the vehicle body, a vibration damper having a damping force connected between each wheel and the vehicle body, and a control device, said control device being configured to:
    determine and set the damping force of the vibration damper, or of each vibration damper, within an actuating range defined by a lower limiting value and an upper limiting value, as a function of a vertical movement of the vehicle body and as a function of a vertical movement of the respective wheel;
    determine the lower limiting value of the actuating range as a function of the vertical movement of the vehicle body and the vertical movement of the respective wheel;
    determine the lower limiting value of the actuation range as a function of a vertical movement direction of the vehicle body and as a function of a vertical relative movement between the vehicle body and the respective wheel;
    divide the vertical movement direction of the vehicle body and the vertical relative movement between the vehicle body and the respective wheel are divided into a plurality of ranges comprising a first range in which the vehicle body moves upward and the respective wheel moves downward or more slowly upward, a second range in which the vehicle body moves downward and the respective wheel moves more quickly downward, a third range in which the vehicle body moves downward and the respective wheel moves upward or more slowly downward, and a fourth range in which the vehicle body moves upward and the respective wheel moves more quickly upward; and
    determine an individual, lower limiting value of the actuating range, which differs from the other ranges, for at least one of these ranges.

7. The method as claimed in claim 4, wherein the upper limiting value of the actuating range is determined as a function of the vertical movement direction of the vehicle body and as a function of the vertical relative movement between the vehicle body and the respective wheel.

8. The method as claimed in claim 4, wherein at least one of these ranges an individual, upper limiting value, which differs from the other ranges, is determined.

9. The method as claimed in claim 1, wherein the damping force is determined and set within the actuating range as a function of a vertical movement direction and/or as a function of a vertical speed and/or as a function of a vertical acceleration of the vehicle body.

10. The motor vehicle as claimed in claim 6, wherein the damping force is determined and set within the actuating range as a function of a vertical movement direction and/or as a function of a vertical speed and/or as a function of a vertical acceleration of the vehicle body.

11. The motor vehicle as claimed in claim 6, wherein for at least two of these ranges, specifically at least the second range and the fourth range, an individual, lower limiting value of the actuating range, which differs from the other ranges, is determined.

12. The motor vehicle of claim 6, wherein, for each of these ranges, an individual, lower limiting value of the actuating range, which differs from the other ranges, is determined.

13. The motor vehicle of claim 6, wherein the upper limiting value of the actuating range is also determined as a function of the vertical movement of the vehicle body and as a function of the vertical movement of the respective wheel.

14. The motor vehicle of claim 13, wherein the upper limiting value of the actuating range is determined as a function of the vertical movement direction of the vehicle body and as a function of the vertical relative movement between the vehicle body and the respective wheel.

15. The motor vehicle of claim 6, wherein for at least one of these ranges an individual, upper limiting value, which differs from the other ranges, is determined.

16. The motor vehicle of claim 13, wherein for at least one of these ranges an individual, upper limiting value, which differs from the other ranges, is determined.

* * * * *

UNITED STATES PATENT AND TRADEMARK OFFICE
CERTIFICATE OF CORRECTION

| | |
|---|---|
| PATENT NO. | : 8,718,871 B2 |
| APPLICATION NO. | : 13/363499 |
| DATED | : April 29, 2014 |
| INVENTOR(S) | : Jochen Liebold et al. |

It is certified that error appears in the above-identified patent and that said Letters Patent is hereby corrected as shown below:

Title Page, Item (73), Assignee, "Dr. Ing. H.C. F. Porsche Aktiengesellschaft" should read -- Dr. Ing. h.c. F. Porsche Aktiengesellschaft --.

Signed and Sealed this
Fifth Day of August, 2014

Michelle K. Lee
*Deputy Director of the United States Patent and Trademark Office*